United States Patent Office 3,382,498
Patented May 7, 1968

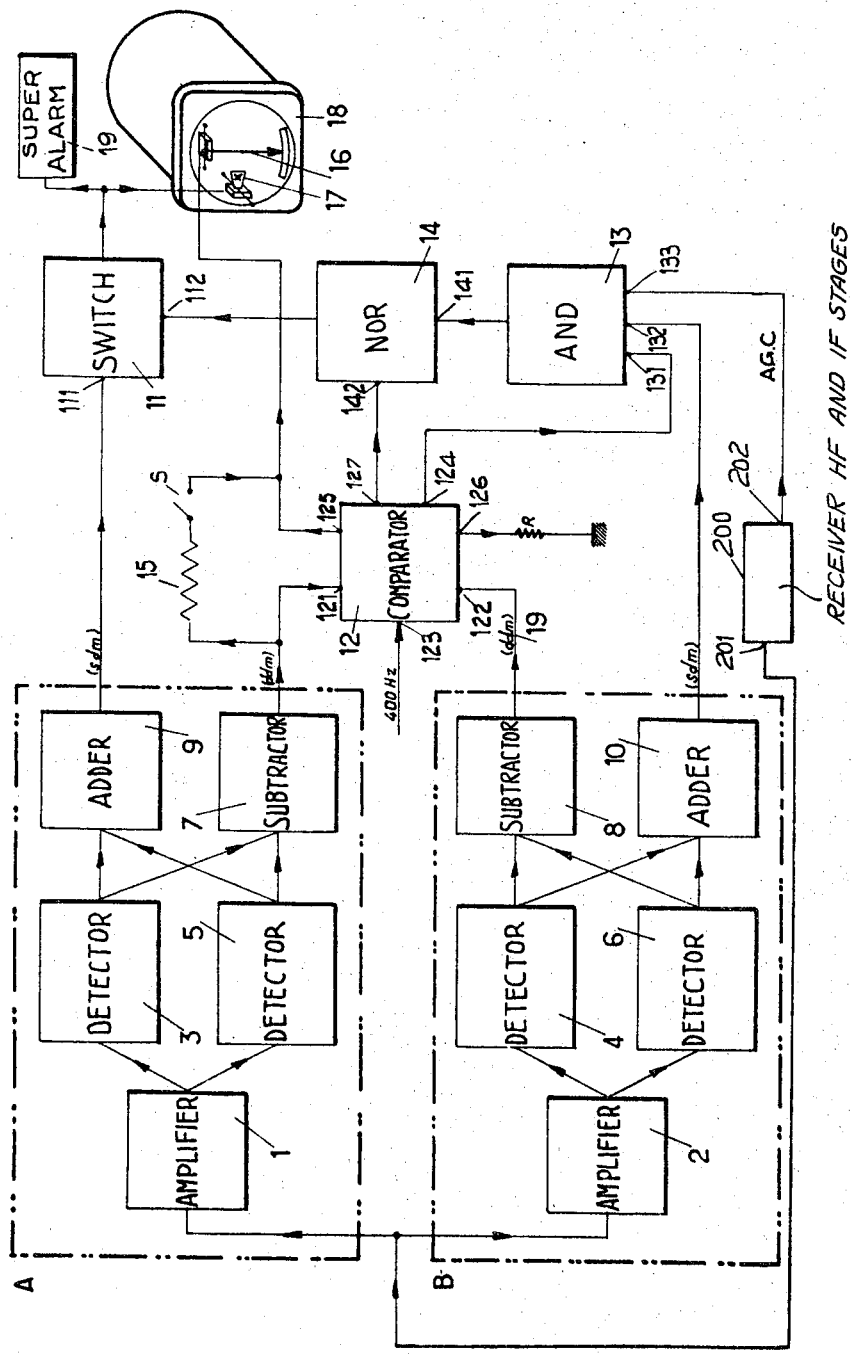

3,382,498
I.L.S. AIR-BORNE RECEIVER
Edouard Mouradian, Paris, France, assignor to CSF—Compagnie Generale de Telegraphie Sans Fil, a corporation of France
Filed Sept. 18, 1966, Ser. No. 582,659
Claims priority, application France, Oct. 4, 1965, 33,619, Patent 1,459,168
4 Claims. (Cl. 343—108)

ABSTRACT OF THE DISCLOSURE

An I.L.S. air-borne receiver for blind landing, comprising a localizer part and a glide path part, each of them being of the type including two low frequency stages, in which is incorporated a monitoring circuit comprising essentially a comparator and logic circuits. This arrangement extends the facilities of conventional warning circuits by causing alarm signal not only in case of absence or insufficiency of received signals but also if the received information is inaccurate, if the receiver is not functioning correctly or if at least one connection is cut-off between the receiver and the utilization circuits.

---

The present invention relates to air-borne I.L.S. (instrument landing system) receivers used for blind landing.

Known air-borne I.L.S. receivers comprise warning circuits which respond only in the absence of received signals or if these received signals are too low. Yet, the use of an instrument landing system, for the automatic landing of aircraft, calls for a practically absolute reliability of the used equipment.

In order to meet this imperative requirement, the present invention relates to a monitoring circuit which is completely integrated in the I.L.S. equipment on board, and permits:

(a) To indicate the absence or insufficiency of received signals (conventional warning information);

(b) To control the accuracy of the data supplied by the utilization circuits;

(c) To make sure of the good functioning of the receiver by supervision of the automatic gain control voltage;

(d) To check the connection of "deviation informations" between the receiver and the utilization circuits.

An I.L.S. system, comprising means for checking the accuracy of informations supplied to the utilization circuits (point (b) above) is already known. This system is heavy and bulky and does not fulfill the functions mentioned under (c) and (d).

The monitoring circuit according to the invention comprises, on the other hand, only elements which can be housed in the I.L.S. receiver of conventional construction, and has also the advantage of preserving the conformity of the equipment with the Standard ARINC 547, insofar as its interconnection with the wiring of the aircraft is concerned. Moreover, it extends the conventional warning information (paragraph (a)) not only to paragraph (b) above, but also to points (c) and (d).

In the improved I.L.S. receiver according to the invention, each part of the receiver (the "runway localizing" part and the "glide path localizing" part) comprises two identical low frequency stages, mounted in parallel and having each a "detected level difference" output and a "detected level sum" output. The two difference outputs are connected to a comparator. The "sum" output of the stage connected to the indicator is connected to the warning device incorporated in the I.L.S. indicator through a cut-off circuit, whilst the "sum" output of the other stage is connected to the first input of an AND circuit whose two other inputs are connected to an output controlling or checking the functioning of the comparator, and to the gain control. A "NOR" circuit, receiving on the one hand the comparison signal from the comparator and on the other hand the output signal from the AND circuit controls the cut-off circuit, which is connected to a conventional warning indicator.

For a better understanding of the invention and to show how the same may be carried into effect reference will be made to the drawing accompanying the following description and the only figure of which is a block diagram of a navigation receiver according to the invention.

The glide slope receiver circuit is in all respects identical to that of the localizer receiver.

The "localizer" receiver comprises, as is well known, two identical low frequency stages A and B, coupled in parallel to the signal output 201, of a high and intermediate frequency stage generally shown at 200. The stage A is continuously in operation and the stage B is used as a reserve and for checking purposes.

Each stage A or B comprises a low frequency amplification stage, 1 or 2, followed by a circuit for detecting a 90 c./s. signal, 3 or 4, and a circuit 5 or 6, for detecting a 150 c./s. signal. Each detection circuit comprises, as known, a narrow bandpass filter, centered on 90 c./s. or 150 c./s., as the case may be, followed by a detector supplying a direct current. Subtractors 7 or 8 and adders 9 or 10, conected to the detectors 3 and 5, or 4 and 6, supply signals which represent, respectively, the differences (difference depth modulation or d.d.m.) in the detected levels of the signals at 90 c./s. and 150 c./s. (in 7 and 8) and the sums (sum depth modulation or s.d.m.) of these signals.

The difference signals represent the useful information and the sum signals the conventional alarm information.

In conventional receivers, the difference output of the used stage A is connected directly to the pointer 16 and the sum output of the same stage to the control of the flag 17 of the alarm device of the glide path alignment of the conventional I.L.S. indicator 18, whose elements (horizontal pointer and flag) for the glide slope alignment have not been represented in order to make the drawing clearer.

In conventional receivers, the circuits for comparing the stages A and B which, moreover, generally permit only to detect an inequality between the difference outputs, are not integrated in the receiver and have no action on the warning flag of the indicator.

On the contrary, according to the invention, the output of the adder 9 is connected to the signal input 111 of a cut-off circuit 11 and the outputs of the subtractors 7 and 8 supply, respectively, the two signal inputs 121 and 122 of a known comparator 12, for example, a magnetic amplifier supplied with alternating current at 400 c./s. at 123 and capable of detecting a deviation of less than ±20μa. which corresponds to a deviation less than ±4μa. on the deviation indicator.

This comparator has four outputs: an output 124 for the operation control, two ouputs 125 and 126, connected respectively directly to the inputs 121 and 122, and a signal output 127, providing a zero signal when the signals from the outputs 125 and 126 are equal. The output 125 is connected directly to the vertical pointer of the indicator 18 and the output 126 is grounded through a resistance R, equivalent to the load of the circuits connected to the "difference" output of stage A.

At 13 is shown an AND-circuit with three inputs 131, 132, 133, connected respectively to the output 124 of the comparator 12, to the output of the adder 10 and to the "automatic gain control" output 202 of the high and intermediate frequency stage of the receiver.

This AND-circuit 13 gives a zero information when the three signals, the comparator operation control signal, the sum output signal of stage B and the gain control signal, are present simultaneously and an information 1, if one or more are missing.

The output of the AND-circuit 13 is connected to the input 141 of a NOR circuit 14, whose second input 142 is connected to the output 127 of the comparator 12, which supplies a signal, when a deviation of more than ±20μa. is detected between the currents at the outputs 125 and 126. The circuit 14 is connected to the control input 112 of the circuit 11.

The NOR circuit 14 receives therefore at least one signal if one of the three input signals of the AND-circuit 13 is absent (signal 1 at the input 141), or if a difference of more than 20μa. is detected at 12.

The NOR circuit 14 supplies a cut-off signal to the switch 11 if one of the signals 141 or 142 or both are present. In these cases the said switch causes the appearance of the warning flag.

The warning signal of the indicator is therefore present, in the case of the absence or insufficiency of the signals received (conventional warning case), in the case of the uncertainty of the information given to the ultilization circuits (signal at the output of the comparator 12 is not zero owing to the difference between the input signals at 121 and 122), in the case of poor operation of the receiver (automatic gain control signal absent or insufficient), in the case of poor operation of the stage B (no signal at the input 132), in the case of cutting the connection of the output of the stage A with the utilization circuits, for example, automatic pilot or computer (in this latter case, the output signal of the comparator 12 is not zero owing to the fact that the resistance R is no longer equal to the load at the difference output of the used stage A), and finally in the case of a breakdown of the comparator, revealed by null or insufficient level of the signal at the output of the comparator 124, and therefore at the input of the AND-gate 131.

The three last mentioned warning cases correspond to an apparently normal operation of the I.L.S. with conventional warning, wherein the received signals have a sufficiently high level but are nevertheless defective since the indications of the I.L.S. indicator are false, which is more dangerous from the safety point of view than a total breakdown of the apparatus, because the pilot is not aware of anything and, therefore, does not take any precaution at all.

The integrated alarm system can be manually tested during the operation by introducing intentionally a variation of the load on the deviation information of the amplifier A by placing in parallel to the input of the comparator 12 a resistor of suitable value. To this effect, a resistor 15 and a breaker S are mounted between the terminals 121 and 125 of the comparator, wherein the breaker is accessible to the pilot.

The output of the cut-off system is also connected to a conventional device 19, the so-called super-alarm device, which transforms the analog indication received into "all or nothing" signals and controls various flying devices as known in the art.

As already mentioned, the glide slope control system is completely identical. Here, the output 125 and the output of the cut-off 11 are connected to the horizontal pointer and to the warning flag control associated therewith.

Of course, the invention is not limited to the embodiment hereinbefore described, which was given merely by way of example. More particularly, the logical condition realized by the devices 11, 13, 14 may be produced by any means known in the art.

What is claimed is:

1. An I.L.S. receiving system comprising: an indicator system comprising an alarm indicator, a receiver having a high and an intermediate frequency stage having a signal output and an automatic gain control output, two identical low frequency stages having a common input coupled to said signal output, each of said low frequency circuits comprising amplifying means having an output, an I.L.S. lower modulation frequency detector coupled to said output, an I.L.S. higher modulation frequency detector coupled to said output, an adder coupled to said two detectors, and a subtractor coupled to said detectors, said adder and detector having respective outputs; a comparator circuit having two inputs respectively coupled to the subtractors of said first and second low frequency circuits, and having at least one signal output, and an operation control output; a logic circuit having a first, a second, a third, a fourth and a fifth input respectively coupled to said comparator control output, to said output of said adder of said second low frequency circuit, to said automatic gain control output, to said comparator signal output and to said output of said adder of said first low frequency circuit, and an output coupled to said alarm indicator for supplying thereto an operation signal upon the absence of any signal at said first, second, third and fifth inputs and upon the presence of a signal at said fourth input.

2. An I.L.S. receiving system according to claim 1, wherein said logic circuit comprises an AND circuit having three inputs which are respectively said first, second and third inputs of said logic circuit, and an output, a NOR circuit having an input which is said fourth input of said logic circuit, another input coupled to said AND circuit output, and an output, and a switch circuit having a signal input which is said fifth input of said logic circuit, a control input coupled to said NOR circuit output, and an output which is said logic circuit output.

3. A system according to claim 1, wherein said comparator further comprises a display output coupled to said alarm indicator.

4. A system according to claim 3 further comprising a test circuit comprising in series a switch and a resistor coupled between said output of said subtractor of said first low frequency circuit and said display output.

References Cited

UNITED STATES PATENTS

| 2,478,734 | 8/1949 | Abraham | 343—108 |
| 2,522,914 | 9/1950 | Winchel et al. | 343—107 |
| 2,624,872 | 1/1953 | Emmett | 343—108 X |
| 2,890,442 | 6/1959 | Glenny et al. | 340—27 |

RODNEY D. BENNETT, *Primary Examiner.*

H. C. WAMSLEY, *Assistant Examiner.*